Apr. 17, 1923.

R. L. FORD 1,452,479

LATCH MECHANISM

Original Filed June 20, 1918

Inventor.
Ralph L Ford,
By N.P. Doolittle
Atty.

Patented Apr. 17, 1923.

1,452,479

UNITED STATES PATENT OFFICE.

RALPH L. FORD, OF CHICAGO, ILLINOIS, ASSIGNOR, BY MESNE ASSIGNMENTS, TO INTERNATIONAL HARVESTER COMPANY, A CORPORATION OF NEW JERSEY.

LATCH MECHANISM.

Original application filed June 20, 1918, Serial No. 240,996. Divided and this application filed May 6, 1921. Serial No. 467,293.

*To all whom it may concern:*

Be it known that I, RALPH L. FORD, a citizen of the United States, residing at Chicago, in the county of Cook and State of Illinois, have invented certain new and useful Improvements in Latch Mechanism, of which the following is a a full, clear, and exact specification.

This invention relates to latching mechanisms and particularly to one adapted for use in connection with the seed hoppers on corn planters and designed to lock the hopper and seed plate to the frame of the planter in such a manner that the hopper and plate can be locked to each other independently of the frame or both the hopper and plate locked to the frame. Other features will be brought out in the following specification and claims.

Figure 2:
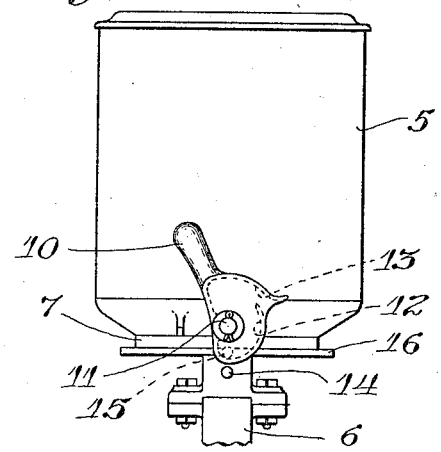
Fig. 2 is a similar view with latch released from the support.

This application is a division of my original application for improvements in hill drop planters, Serial No. 240,996, filed June 20, 1918.

I have illustrated my invention in connection with a seed hopper 5 which is hinged at one side as at 17, to a corn planter frame 6 in the usual manner. The hopper contains seed feeding mechanism including a rotating seed plate 7 which discharges into a dropping chute 8 and is driven from shaft 9, the seed plate and hopper normally resting on a bottom member or plate retaining ring 16 which is also hinged at 17 to the planter frame.

Figure 1:
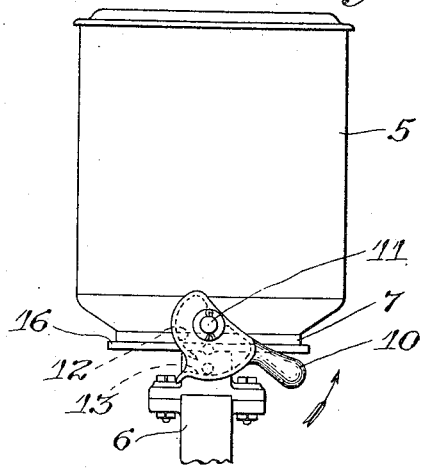
Fig. 1 is a front elevation showing a planter hopper with latch device in locked position.
Figure 3:
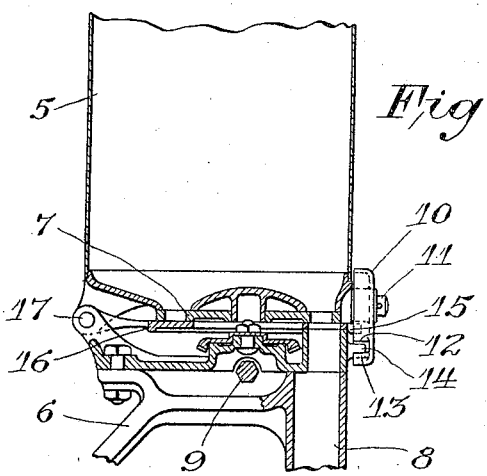
Fig. 3 is a vertical section through the hopper and support with the latch shown in side view.
Figure 4:
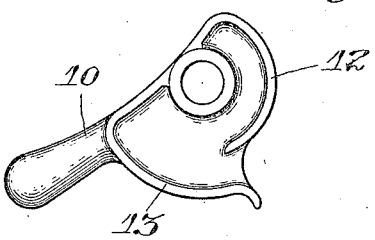
Fig. 4 is an enlarged view of the latch member.

In the present embodiment of my invention the latch is formed in the shape of a cam member 10, pivoted at 11 to the hopper, and having two cam surfaces 12 and 13 which cooperate respectively with the pins 14 and 15 carried by the frame of the planter and the seed plate retaining ring 16. In Fig. 1 the cam is shown in its normal position locking the hopper to the frame of the planter. When it is desired to swing the hopper about its pivot the cam member 10 is swung in the direction of the arrow, thereby releasing the cam 13 from the pin 14 carried by the frame, and locking the pin 15 carried by the seed plate retaining ring within the cam surface 12. In this way the seed plate retaining ring will be retained in position and can be swung on pivot 17 with the hopper. After the hopper has been swung aside, if it is desired to release the retaining ring to remove the seed plate, the cam 10 may be swung in the direction opposite to its original movement, and the pin 15 of the seed plate retaining ring will be released from the retaining cam 12.

From the above description it will be seen that I have provided an exceedingly practical and simple construction for retaining the seed hopper and dropping mechanism in locked position during the operation of the machine, while permitting the plate retaining ring to be locked to and swung with the hopper or released therefrom as may be desired.

It is to be understood that my invention is not restricted to the specific embodiment here disclosed, but is capable of modification within the scope of the following claims.

I claim as my invention:

1. In a planter, a support, a hopper hinged thereon, a bottom member also hinged on said support and on which the hopper normally rests, and a single latch device including means for locking the hopper to the support when the latch is moved to one position and also means for locking the bottom member to the hopper and releasing the hopper from the support when the latch is moved to another position.

2. In a corn planter, a frame, a seed hopper movably mounted on said frame, and having a seed plate, and locking means operable in one position of adjustment to lock said seed hopper to said frame, and in another position of adjustment operable to lock said seed plate to said hopper.

3. In a corn planter, a frame, a seed hopper pivotally mounted thereon, and pivoted locking means carried by said hopper and operable in one position of adjustment to lock said hopper to said frame, and in another position of adjustment to lock said seed plate to said hopper.

4. In a corn planter, a frame, a seed hopper pivoted thereon and having a seed plate, a pivoted locking member carried by said hopper and having a plurality of cams thereon whereby said locking member in one position of its adjustment will lock the seed hopper to the frame, and in another position of its adjustment will lock the seed plate to the seed hopper.

5. In a corn planter, a frame, a seed hopper pivoted thereon and carrying a seed plate, a pivoted locking member carried by said hopper and provided with a plurality of cam surfaces so located with respect to each other and to the pivot of said locking member that rotation of said locking member in one direction will unlock said hopper from said frame and will simultaneously lock said seed plate to said hopper.

6. In a corn planter, a frame, a seed hopper pivoted thereon and carrying a seed plate, a pivoted locking member carried by said seed hopper and having a plurality of concentric cam surfaces so located with respect to each other that rotation of said member on one direction will release said seed hopper from locking engagement with said frame and will lock the seed plate with respect to said hopper.

In testimony whereof I affix my signature.

RALPH L. FORD.